United States Patent Office
3,842,179
Patented Oct. 15, 1974

3,842,179
ANTI-MICROBIAL DIARALKYLAMINOALKYL ETHERS AND PROCESS FOR PROTECTING PLANTS
Carl Bordenca, Ponte Vedra Beach, Fla., and Kenneth P. Dorschner, Vienna, Va., assignors to SCM Corporation, Cleveland, Ohio
No Drawing. Continuation-in-part of abandoned application Ser. No. 123,424, Mar. 11, 1971. This application Nov. 27, 1972, Ser. No. 309,722
Int. Cl. A01n 9/20
U.S Cl. 424—330       7 Claims

ABSTRACT OF THE DISCLOSURE

N—[($C_{8-12}$ alkoxy)($C_{2-6}$ alkyl)] diaralkylamines and compositions containing them are useful non-phytotoxic anti-microbial agents which protect growing plants from pathogenic micro-organisms, especially fungi.

CROSS REFERENCES TO RELATED APPLICATIONS

This application is a continuation-in-part of U.S. patent application Ser. No. 123,424, filed Mar. 11, 1971, now abandoned assigned to the same assignee as the present application, the subject matter of which is incorporated herein by reference.

BACKGROUND OF THE INVENTION

This invention relates to certain tertiary amine antimicrobial compositions and processes useful in protecting plants from airborne or waterborne phytopathogenic micro-organisms.

It has been discovered that certain N—[($C_{8-12}$ alkoxy) ($C_{2-6}$ alkyl)] diaralkylamines are advantageous in that they are substantially non-phytotoxic to plants at levels and/or concentrations at which they are effective antimicrobial agents.

Compounds and compositions of this invention appear to control such micro-organisms in an eradicant manner and some appear to also protect new plant growth in a systemic protectant manner. The compounds of th's invention, while similar to known compounds, are novel. Such related compounds have been synthesized and tested as herbicides by Bordenca et al. (U.S. Pat. 3,397,053), as insecticides by Hester (U.S. Pat. 2,302,388), for treating inflammations in mammal bodies by Thiele (U.S. Pat. 3,472,845), and by Rothenberger (U.S. Pat. 2,316,-625). Applicant's compounds, process and use have not been previously reported. The closest prior art known to applicants is listed in PO-1082, attached hereto.

Brief Summary of the Invention

In one aspect, our invention is a composition for protecting growing plants from attack by micro-organisms when applied to said plants as a non-phytotoxic dispersion containing about 20-2500 p.p.m. of microbially active ingredient, said compoistion comprising an agriculturally acceptable dilution assistant and 0.5-99.5% of a microbially active ingredient of the formula:

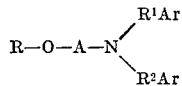

where
R is a $C_{8-12}$ alkyl radical;
A is a $C_{2-6}$ alkylene radical;
$R^1$ and $R^2$ are $C_{1-2}$ alkylene radicals; and
Ar and Ar' are radicals selected from the group consisting of phenyl, tolyl, xylyl and naphthyl.

Another aspect is a process for protecting plants from attack by pathogenic micro-organisms which comprises contacting at least a portion of the surface of the plant with a non-phytotoxic dispersion prepared by diluting a composition comprising an agriculturally acceptable dilution assistant and 0.5-99.5% of the above described diaralkylamine.

Effective application dilutions suitably are from 20 to 2500 parts active ingredients per million parts of end-use formulation and can vary considerably depending on environment, climate and exposure.

The invention also relates to non-phytotoxic compositions containing the aforementioned compounds, and methods for preventing and/or controlling disease in growing plants.

Yet another aspect of the present invention is a composition and process as described above wherein the composition contains 20-80% clay, and about 1-16% surfactant, including nonionic and anionic surfactants and mixtures thereof.

The compounds and compositions containing them have been found to be effective against a wide variety of species of genera of micro-organisms, especially species of *Erysiphe, Podosphaera, Gymnosporangium, Venturia, Plasmopara, Elsinoe, Guignardia, Pseudoperonospora* and the like. These micro-organisms are, for the most part, usually airborne fungi which attack the foliage of fruit and vegetable crops, including, for example: apples, grapes, cantaloupes and the like, either killing the plants or causing severe damage to the point where crop yields are often severely limited. Surprisingly, compounds falling within the scope of the formula are non-phytotoxic to plants at levels at which they are effective against such micro-organisms. The compounds falling within the scope of the above formula, while effective against such plant pathogens are not particularly effective against soil-inhabiting plant pathogens.

Typical compositions will be concentrate containing advantageously between 0.5 and 50 and in some instances 0.5-25 weight percent of the microbially active agents herein defined. The balance of the composition will comprise an agriculturally acceptable dilution assistant.

Usually such dilution assistants are liquids, finely divided siliceous material, surfactants or mixtures thereof which are useful in the handling, metering and dispersing of one or more of the active tertiary amine ingredients. The compositions are generally further diluted with an inexpensive inert liquid, preferably water, for end use application. Dilute groups containing from about 25 to about 2500 and preferably 62.5-500 parts per million active ingredient are applied in amounts sufficient to wet the plant surface using a hand gun operated at a pressure of about 100 to 550 pounds per square inch. The dilute spray generally contains from about 0.25 lb. to 1.0 lb. active ingredient per 100 gallons of spray. These rates correspond to about 0.5 to 2.0 lb. active ingredient deposited per acre treated. Higher loadings may be desirable in certain instances but are less economical. Implied herein are the typical techniques and formulations commonly empoloyed by those skilled in the formulation and use of agricultural fungicides.

The terms "phyto-pathogen" or "plant-pathogen" as used herein are intended to mean and to include microorganisms, usually of airborne or waterborne origin, which cause diseases in crop plants resulting in death of the plant or injury to the extent that crop yields from the plants are severely limited.

The term "microbially active ingredient" as used herein means and includes compounds and compositions which, when applied to at least a portion of the surface of growing plants including foliage, stems, bark, blossoms and fruit, overcome or prevent attack by such disease-causing micro-organisms. The forms designated by the term "micro-organism" include bacteria, fungi, protozoa, algae and spermatozoa.

As previously noted in the above-mentioned formula, R is an aliphatic group containing from 8 to 12 carbon atoms. Thus, R can be straight or branched octyl, nonyl, decyl, un-decyl and dodecyl. Examples of groups represented by R include methyl heptyl, dimethyl hexyl, methyl octyl, dimethyl heptyl, methyl nonyl, dimethyl, octyl, methyl decyl, dimethyl nonyl, methyl un-decyl, dimethyl decyl and the like. Advantageous compounds are those in which R is n-decyl or branched decyl and particularly advantageous compounds are those wherein R is 3,7-dimethyl octyl.

A in the above formula is lower alkylene containing between 2 and 6 carbon atoms and is preferably ethylene for economic reasons. However, A can be 1,3-propylene, 1,2-propylene, 1,4-butylene, 1,3-butylene, 2,3-butylene and 1,6-hexylene.

In compounds falling within the scope of the above Formula, $R^1$ and $R^2$ groups are lower alkylene having 1 or 2 carbon atoms. Thus, $R^1$ and $R^2$ can be a methylene or an ethylene group. The compounds wherein $R^1$ and $R^2$ groups are methylene have been found to be particularly preferable for the inventive purpose. The aromatic groups Ar and Ar', attached to the alkylene groups, are like or unlike and can be any of a variety of aromatic groups such as, for example, aromatic hydrocarbon groups including: phenyl, naphthyl, and substituted aromatic groups including tolyl and xylyl groups. Compounds in which Ar and Ar' are like unsubstituted aromatic hydrocarbon groups have been found to be especially advantageous, and compounds in which Ar and Ar' both are phenyl groups are particularly preferred, since these compounds exhibit maximal anti-microbial activity with minimum danger of phytotoxic activity. Compounds where one of the Ar groups is replaced by a lower alkyl group or a hydrogen have a tendency to be extremely phytotoxic and are not useful for the treating of crop plants.

It should be pointed out that almost any compound applied in pure form or in sufficiently high concentrations to growing plants can adversely affect the surfaces of the plants. The compounds of this invention are notable in that they are effective anti-microbial agents at levels where they do not substantially adversely affect crop plants.

The agriculturally acceptable dilution assistant can be any of a wide variety of organic and inorganic, liquid or solid formulations conventionally used in the agricultural art. Liquid hydrocarbon diluents, including oils produced by the distillation of coal and/or petroleum stocks, can be emulsified with water and thus allow the use of an aqueous spray for application purposes.

The dilution assistant can comprise other conventional additives including emulsifying agents and surfactants which permit the composition to be dispersed in and diluted with water for end-use application. These are generally used in amounts ranging from 0.5 to 16 percent by weight of the composition. Suitable non-ionic surfactants include types such as the ethylene oxide condensate of octylphenol. Suitable anionic surfactants include for example, an alkali metal salt of an alkylbenzenesulfonic acid.

Solid dilution assistants which can be used in the compositions include finely divided siliceous minerals, such as clays, e.g., bentonite, attapulgite, fullers earth, diatomaceous earths, kaolin, mica, talc, finely divided quartz, etc., as well as synthetic siliceous materials including precipitated and fume silicas. The microbially active compound of this invention will be present in about 0.5 to 99.5 percent of the concentrate. The precise proportion of compound employed will depend on whether the composition is intended for direct application or whether it is a form suitable for further dilution immediately prior to end use application. It is desirable for storage and shipping purposes to load a wettable powder formulation or a dust with up to about 80% by weight of the active microbial agent.

The invention process comprises contacting at least a portion of the surfaces of growing plants with an amount effective for killing phyto-pathogenic microorganisms of a compound falling within the scope of the above-described Formula. Contact can be effected by spraying liquid compositions on the foliage, stems, flowers and/or fruit of the crop. Alternatively, where a suitable powder is employed, it may be atomized onto the surface as a dust or, in the case of a wettable powder, it may be diluted and sprayed as a liquid dispersion.

The tertiary amino ethers of this invention may be named either as amines or as ethers. Thus, the compound N-(3,7-dimethyloctyloxyethyl) dibenzylamine is also correctly characterized as 2-dibenzylaminoethyl 3, 7-dimethyloctyl ether. We prefer generally to use the amine nomenclature. The amines of this invention can be prepared by conventional methods of synthesis as indicated in U.S. Pats. 2,302,388, 2,316,625, 3,397,053 and 3,472,845. One method is to react two moles of a secondary amine (diaralkylamine) with one mole of the appropriate $C_{8-12}$ alkyloxyalkyl halide in the presence of a base. The reaction can take place by heating the reactants with or without the presence of inert solvents. Typical inert solvents used are toluene and xylene which allow a fairly high but moderated reaction temperature. In this reaction sequence an inorganic or organic base is commonly added to react with the by-product hydrogen halide. Organic bases such as pyridine or triethylamine are sometimes used and allow easy separation of products because the water soluble tertiary amine hydrohalides are easily removed by filtration or by washing the organic phase with water prior to concentration and distillation of the desired N-(alkyloxyalkyl) diaralkylamines. In some cases where the products are solids, recrystallization is preferred to distillation.

A preferred method involves first making the metallic salt of the diaralkylaminoalkanol with metallic sodium or sodium hydride in an inert solvent and thereafter condensing the sodium alcoholate with the desired $C_{8-12}$ aliphatic halide. Although aliphatic bromides are preferred because of their increased activity, the chlorides are generally used because of their availability and for economic reasons. In the synthesis of the 3,7-dimethyloctyl derivatives it is sometimes convenient to prepare the geranyl or neryl analogs which can be easily hydrogenated to the 3,7-dimethyloctyl intermediates or products.

Specific N-[$C_{8-12}$ alkoxy) ($C_{2-6}$ alkyl)] diaralkylamines which are useful in the practice of this invention include:

N-[2-(3,7-dimethyloctyloxy)ethyl] di(2 - methylbenzyl) amine and the 3- and 4-methylbenzyl analogs;
N-[2-(n-decyloxy)ethyl] di(2,3-dimethylbenzyl) amine and the 2,4- and 3,4-dimethylbenzyl analogs; and,
N-[2 - (3,7 - dimethyloctyloxy)propyl] di(1 - naphthylmethyl) amine and the 2-naphthylmethyl analog.

The compounds of the present invention range from high-boiling liquids to low-melting solids and have limited water solubility. They can be made water soluble by reacting them with a suitable acid, such as, for example, hydrochloric sulfuric or phosphoric acid to convert the compounds into the corresponding amine acid salt. Under such circumstances the application diluent can be water. It is contemplated that both the free tertiary amines and their water soluble salts will be useful in the practice of this invention.

The following specific examples are intended to illustrate the invention, but not to limit the scope thereof;

parts and percentages being by weight unless otherwise specified:

EXAMPLE 1

N-[2-3,7-dimethyloctyloxy)ethyl] dibenzylamine

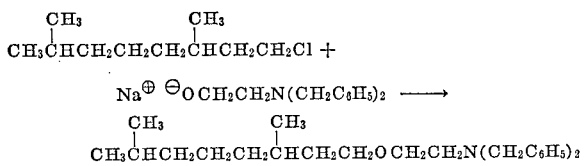

Dimethylformamide (150 ml) and 21.3 grams (0.1 mole) of 2-dibenzylaminoethanol was charged to a 500 ml. round-bottom flask fitted with dropping funnel, stirrer and reflux condenser. The system was blanketed with a nitrogen atmosphere and 6.1 grams (0.12 mole) of sodium hydride in a mineral oil dispersion was added slowly with stirring.

After stirring for 2 hours at 60° C. and the reaction mixture was cooled to room temperature and 21.0 grams (0.13 moles) 3,7-dimethyloctylchloride dissolved in 100 ml. benzene was added dropwise with stirring. The mixture was refluxed for 12 hours.

Isolation of the product was effected by washing the benzene solution with water (500 ml.), evaporating the benzene on a rotary evaporator and distilling the residue under reduced pressure. N-[2-(3,7-dimethyloctyloxy)ethyl]dibenzylamine was isolated in 7.3% yield, b.p. 198°/0.8 min., $n_D$ 1.5095/24° C. Purity was estimated at 93% by infrared spectroscopy.

EXAMPLE 2

N-[3-(3,7-dimethyloctyloxy)propyl]dibenzylamine

EXAMPLE 3

N-[2-(geranyloxy)ethyl]dibenzylamine

EXAMPLE 4

N-[2-(n-decyloxy)ethyl]dibenzylamine

EXAMPLE 5

N-[6-(3,7-dimethyloxy)hexyl]dibenzylamine

The above-named examples were prepared in a manner similar to the procedure of Example 1 with the exception that in Example 3 and 4, geranyl and n-decyl chlorides were used in place of the 3,7-dimethyloctyl chloride and in Examples 2 and 5, 3-dibenzylaminopropanol and 6-dibenzylaminohexanol were used in place of 2-dibenzylaminoethanol. The physical properties are listed in Table 1.

decanol and that of 3,7-dimethyl 1-octanol in the amounts indicated in Table 2.

At the time the plants were treated, the trifoliate leaves were still in the primordial stage, thus only the cotyledonary leaves were sprayed. The plants were then placed in the greenhouse and again subjected to daily spore showers for four days, thus inoculating the trifoliate leaves as they developed and re-inoculating the cotyledonary leaves.

Eradicant activity was determined by the extent of mildew development on the cotyledonary leaves at the end of the test, which was concluded after fourteen days. The measurement of the degree of mildew on the cotyledonary leaves is a measure of both eradicant and protectant activity, since the leaves had been previously sprayed with spores and continuously re-inoculated by the spore showers. No chemical had been applied to the trifoliate leaves and such leaves, when free of mildew upon full development, indicated that the systemic activity with active material in the plant was provided.

Table 2 shows that the compounds were not phytotoxic and protected, controlled or eradicated 94 and 80% of the pathogens. The 3,7-dimethyl 1-octanol ether was 98% effective systemically. The compound 2-(1-methyl-n-heptyl)-4,6-dinitrophenyl crotonate is a standard product widely used as an agent to combat foliar plant pathogens. None of the materials tested exhibited phytotoxicity. The control group of untreated plants sustained severe injury through the infection by the pathogen spores.

TABLE 2

[Response of the pathogen Erysiphe polygoni on beans to foliar applied treatments. Greenhouse test. Materials applied in acetone-water plus surfactant]

| Chemical treatments | Application rates (p.p.m.) | Percent control, eradication | Percent control, systemic | Phytotoxicity |
|---|---|---|---|---|
| N-[2-(n-decyloxy)ethyl] dibenzylamine. | 500 | 80 | 0 | None. |
| N-[2-(3,7-dimethyl-octyloxy)ethyl] dibenzylamine. | 500 | 94 | 89 | Do. |
| 2-(1-methyl-n-heptyl)-4,6-dinitrophenyl crotonate. | 500 | 98 | 53 | Do. |
| Control | | | | |

EXAMPLE 7

The procedure of Example 6 was repeated except that three sets of bean plants were treated with 500, 250 and 125 parts per million of the compositions in an aqueous emulsion. No phytotoxicity was observed. Compositions of the Compound of Example 1 exhibited activity substantially identical to that of the standard control insofar as eradicant activity was concerned and also exhibited considerable systemic anti-microbial control. The results are set forth in Table 3 below.

TABLE 1

R—O—A—N(CH$_2$C$_6$H$_5$)$_2$

| Compound of— | Structure R— | A | Empirical formula | B.P. (° C./mm.) | $n_D$/° C. | Yield (percent) | Estimated purity (percent) |
|---|---|---|---|---|---|---|---|
| Example 2 | 3,7DMO | —CH$_2$CH$_2$CH$_2$— | C$_{27}$H$_{41}$NO | 194/0.25 | 1.5115/21 | 15 | 98 |
| Example 3 | Geranyl | —CH$_2$CH$_2$— | C$_{26}$H$_{35}$NO | 200/0.1 | 1.5335/20 | 29 | 99 |
| Example 4 | n-Decyl | —CH$_2$—CH$_2$— | C$_{26}$H$_{39}$NO | 189/0.15 | 1.5120/21 | 34 | 99 |
| Example 5 | 3,7DMO | —(CH$_2$)$_6$— | C$_{30}$H$_{47}$NO | 220/0.25 | 1.5130/20 | 97 | 97 |

Note.—3,7DMO = 3,7-dimethyloctyl-

EXAMPLE 6

Soil was placed in individual disposable 4" square by 6" deep containers and three bean seeds (red kidney beans—Phaseolus vulgaris) were planted and placed in a green house.

After the plants had developed to the point where they had fully expanded cotyledonary leaves but did not have trifoliate leaves exposed, the plants were inoculated with a spore shower of bean mildew (Erysiphe polygoni). The plants were inoculated with spore showers on four successive days, at the end of which incipient infection was apparent in the cotyledonary leaves which had a mottled appearance. At this time, the plants were sprayed with water acetone dispersions of dibenzylaminoethyl ether of n-

TABLE 3

[Response of Erysiphe polygoni on beans to foliar applied chemical treatments. Greenhouse test. Chemicals applied as aqueous emulsions]

| Chemical treatments | Application rates (p.p.m.) active | Percent control, eradicant | Percent control, systemic |
|---|---|---|---|
| N-[2-(n-decyloxy)ethyl]dibenzylamine | 500 | 80 | 0 |
| | 250 | 50 | 0 |
| | 125 | 0 | 0 |
| N-[2-(3,7-dimethyl-octyloxy)ethyl] dibenzylamine | 500 | 95 | 65 |
| | 250 | 90 | 40 |
| | 125 | 75 | 20 |
| 2-(1-methyl-n-heptyl)-4,6-dinitrophenyl crotonate | 500 | 95 | 75 |
| | 250 | 95 | 50 |
| | 125 | 80 | 30 |
| None | | | |

When dibenzylaminoethyl thioethers are employed in place of the compounds employed in Examples 6 and 7 and the procedures of those Examples are repeated, similar results are obtained. When di-(methylbenzyl)-aminoethyl ethers and thioethers of n-decanol and 3,7-dimethyl octanol or the corresponding mercaptans are employed in place of the compounds employed in Examples 6 and 7, similar, or substantially the same results are obtained as the results shown in these examples. When di-(naphthyl methylene)-aminoethyl ethers and thioethers of n-decanol and 3,7-dimethyl octanol or the corresponding mercaptans are employed, similar results are obtained.

EXAMPLE 8

The procedures of Examples 6 and 7 were repeated except that Compositions A and Compositions B were prepared as set forth in Table 4.

TABLE 4

| Ingredient | Composition, percent | |
|---|---|---|
| | A | B |
| Dibenzylaminoethyl ether of n-decanol* | 25.00 | |
| Dibenzylaminoethyl ether of 3,7-dimethyl 1-octanol** | | 25.00 |
| Attapulgus clay | 67.50 | 67.50 |
| Oleic acid ester of sodium isethionate | 3.75 | 3.75 |
| Lignin sulfonate | 3.75 | 3.75 |

*Compound of Example 4.
**Compound of Example 1.

The formulations so prepared formed suspensions in water and were diluted with water to the point where the active ingredients were at a level of 500 parts per million, 250 parts per million and 125 parts per million. The results are set forth in Table 5 and indicate that these compounds formulated as a wettable powder are quite effective both as contact foliar treatments and systemic foliar treatments against the mildew pathogen.

TABLE 5

[Response of *Erysiphe polygoni* on beans to foliar applied chemical treatments. Greenhouse test. Chemicals applied as wettable powders]

| Chemical treatments | Application rates (p.p.m.) active | Percent control eradication | Percent control systemic |
|---|---|---|---|
| Compound of Example 4 | 500 | 98 | 70 |
| | 250 | 95 | 60 |
| | 125 | 70 | 20 |
| Compound of Example 1 | 500 | 98 | 60 |
| | 250 | 98 | 30 |
| | 125 | 50 | 10 |
| 2-(1-methyl-n-heptyl)-4,6-dinitrophenyl crotonate | 500 | 100 | 60 |
| | 250 | 100 | 50 |
| | 125 | 95 | 30 |
| None | | | |

The compounds of this invention have been shown to be effective against *Podosphaera leucotricha, Gymnosporangium juniperi,* and *Venturia inaequalis* which are plant pathogens which commonly attack foliage of apple trees. They have also been found to be effective against *Plasmopara viticola, Elsinoe ampelina,* and *Guignardia bidwelli* which commonly infect grape arbors. The compounds have been further found to be effective against pathogens which infest cantaloupes, including *Pseudoperonospora cubensis* and *Erysiphe cichoracearum*.

The compounds and compositions and processes comprising this invention in its various embodiments are particularly advantageous in that the materials degrade and do not accumulate in the environment, thereby replacing a significant number of anti-microbial agents which, because of their cumulative effects, pose a threat to environment.

EXAMPLE 9

The compound of Example 3, N-[2-(geranyloctyl) ethyl] dibenzylamine, when tested by the procedure of Example 7 showed no eradicant or systemic activity when applied at a dosage of 500 parts per million. The geranyloxy compound is an unsaturated analog of the effective compound of Example 1.

Similarly the following compounds when evaluated at 500 parts per million showed no eradicant or systemic activity:

N-[2-(n-butyloxy)ethyl] dibenzylamine
N-[2-(methyloxy)ethyl] dibenzylamine

The result indicates the criticality of the $C_{8-12}$ alkyl portion in the N-[($C_{8-12}$ alkoxy)($C_{2-6}$ alkyl)] diaralkylamines in providing useful and non-phytotoxic anti-microbial agents.

EXAMPLE 10

The di-isopropylamino analog of Example 1, N-[2-(3,7-dimethyloctyloxy)ethyl] di-isopropylamine, when tested according to the procedure of Example 7 when applied at a dosage of 500 parts per million showed no eradicant or systemic activity. In addition it was observed to be phytotoxic to the bean plants.

The ethylamino analog of Example 1, N-[2-(3,7-dimethyloctyloxy)ethyl] monoethylamine, was similarly phytotoxic.

The following compounds when tested at 500 parts per million showed moderate eradicant activity but were markedly phytotoxic to the bean plants:

N-[2-(3,7-dimethyloctyloxy)ethyl] di-(n-butyl) amine
N-[2-(3,7-dimethyloctyloxy)ethyl] N-ethyl benzylamine The above examples indicate the critically of the diaralkylamino portion of the inventive compounds in providing useful and non-phytotoxic anti-microbial agents.

Having thus described the invention what is claimed is:

1. A composition for protecting a growing plant from attack by pathogenic fungi, said composition comprising an agriculturally acceptable dilution assistant and an effective fungicidal amount of about 0.5 to 99.5% of N-[2-(3,7-dimethyloctyloxy)ethyl] dibenzylamine or N-[2-(n-decyloxy)ethyl] dibenzylamine.

2. A process for protecting a plant from attack by pathogenic fungi which comprises contacting the plant with an effective fungicidal amount of a compound of the formula:

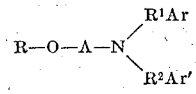

where

R is a $C_{8-12}$ alkyl radical;
A is a $C_{2-6}$ alkylene radical;
$R^1$ and $R^2$ are $C_{1-2}$ alkylene radicals;

and

Ar and Ar' are radicals selected from the group consisting of phenyl, tolyl, xylyl and naphthyl.

3. The process of Claim 2 wherein the compound is N-[($C_{8-12}$ alkoxy)($C_{2-6}$ alkyl)] dibenzylamine.

4. The process of Claim 2 wherein the compound is N-[2-(3,7-dimethyloctyloxy)ethyl] dibenzylamine.

5. The process of Claim 2 wherein the compound is N-[2-(n-decyloxy)ethyl] dibenzylamine.

6. The process of Claim 2 wherein such compound is formulated with 20–80% clay and 1–16% of an anionic or nonionic surfactant based on total weight.

7. The process of Claim 6 wherein the clay is attapulgus clay and the surfactant is anionic.

References Cited

UNITED STATES PATENTS

| 2,302,388 | 11/1942 | Hester | 424—187 |
| 2,941,967 | 6/1960 | Möller et al. | 260—2.5 |
| 3,206,512 | 9/1965 | Koebner et al. | 260—570.7 |

VINCENT D. TURNER, Primary Examiner

U.S. Cl. X.R.

71—67; 260—570.5 R